US012603236B2

(12) United States Patent
Chen et al.

(10) Patent No.: US 12,603,236 B2
(45) Date of Patent: Apr. 14, 2026

(54) KEY STRUCTURE

(71) Applicant: Acer Incorporated, New Taipei City (TW)

(72) Inventors: Hung-Chi Chen, New Taipei City (TW); Cheng-Han Lin, New Taipei City (TW); Chuan-Hua Wang, New Taipei City (TW); Po-Yi Lee, New Taipei City (TW); Pin-Chueh Lin, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 240 days.

(21) Appl. No.: 18/515,266

(22) Filed: Nov. 21, 2023

(65) Prior Publication Data

US 2024/0347288 A1 Oct. 17, 2024

(30) Foreign Application Priority Data

Apr. 11, 2023 (TW) ................................ 112113518

(51) Int. Cl.
*H01H 13/02* (2006.01)
*H01H 9/54* (2006.01)

(52) U.S. Cl.
CPC ............ *H01H 13/023* (2013.01); *H01H 9/54* (2013.01); *H01H 2219/002* (2013.01)

(58) Field of Classification Search
CPC ........... H01H 2003/12; H01H 2003/16; H01H 2003/161; H01H 2003/164; H01H 2003/18; H01H 2003/182; H01H 2003/186; H01H 2215/00; H01H 2215/004; H01H 2215/008; H01H 2219/0023; H01H 2219/002; H01H 2219/054; H01H 2221/044; H01H 9/54; H01H 3/00; H01H 3/02; H01H 3/12; H01H 13/00; H01H 13/02; H01H 13/023; H01H 13/14; H01H 13/20; H01H 13/50; H01H 13/52; H01H 13/70; H01H 13/83; H01H 13/702; H01H 13/7065
USPC ........................................................ 200/314
See application file for complete search history.

(56) References Cited

U.S. PATENT DOCUMENTS 10,224,157 B2 * 3/2019 Leong ................... G06F 3/0202
2022/0155890 A1 5/2022 Wang et al.

FOREIGN PATENT DOCUMENTS

TW 202249048 12/2022

* cited by examiner

*Primary Examiner* — Anthony R Jimenez
(74) *Attorney, Agent, or Firm* — JCIPRNET

(57) ABSTRACT

A key structure including a base plate, a thin film circuit, a display key, an elastic supporting member, and a lifting mechanism is provided. The thin film circuit is disposed on the base plate. The display key is disposed above the thin film circuit. The elastic supporting member is disposed between the display key and the thin film circuit. The lifting mechanism is disposed between the display key and the base plate.

8 Claims, 4 Drawing Sheets

KEY STRUCTURE

CROSS-REFERENCE TO RELATED APPLICATION

This application claims the priority benefit of Taiwan application serial no. 112113518, filed on Apr. 11, 2023. The entirety of the above-mentioned patent application is hereby incorporated by reference herein and made a part of this specification.

BACKGROUND

Technical Field

The disclosure relates to a key structure, and particularly relates to a key structure having a display function.

Description of Related Art

As a common physical input device, a keyboard is widely applied to laptops, personal desktop computers, or other electronic devices. In detail, the keyboard comprises multiple keys, and keycaps of the keys are printed with specific characters for users to identify input functions of the keys. Since the characters on the keycaps and the input functions of the keys are already set when leaving the factory, the users have difficulty defining the characters on the keycaps and the input functions of the keys themselves. They also cannot obtain other information besides the input functions through the keycaps. This not only lacks convenience and flexibility of operation but also results in a poor user experience.

SUMMARY

The disclosure provides a key structure which helps optimize the user experience.

A key structure according to an embodiment of the disclosure includes a base plate, a thin film circuit, a display key, an elastic supporting member, and a lifting mechanism. The thin film circuit is disposed on the base plate. The display key is disposed above the thin film circuit. The elastic supporting member is disposed between the display key and the thin film circuit. The lifting mechanism is disposed between the display key and the base plate.

Based on the above, the key structure of the disclosure has a display function, a user can identify an input function or obtain other information content besides the input function through a display screen thereof, so an excellent user experience is provided.

In order to make the above features and advantages of the disclosure more clearly understandable, embodiments are described below with reference to the accompanying drawings.

DESCRIPTION OF THE EMBODIMENTS

Figure 1A:
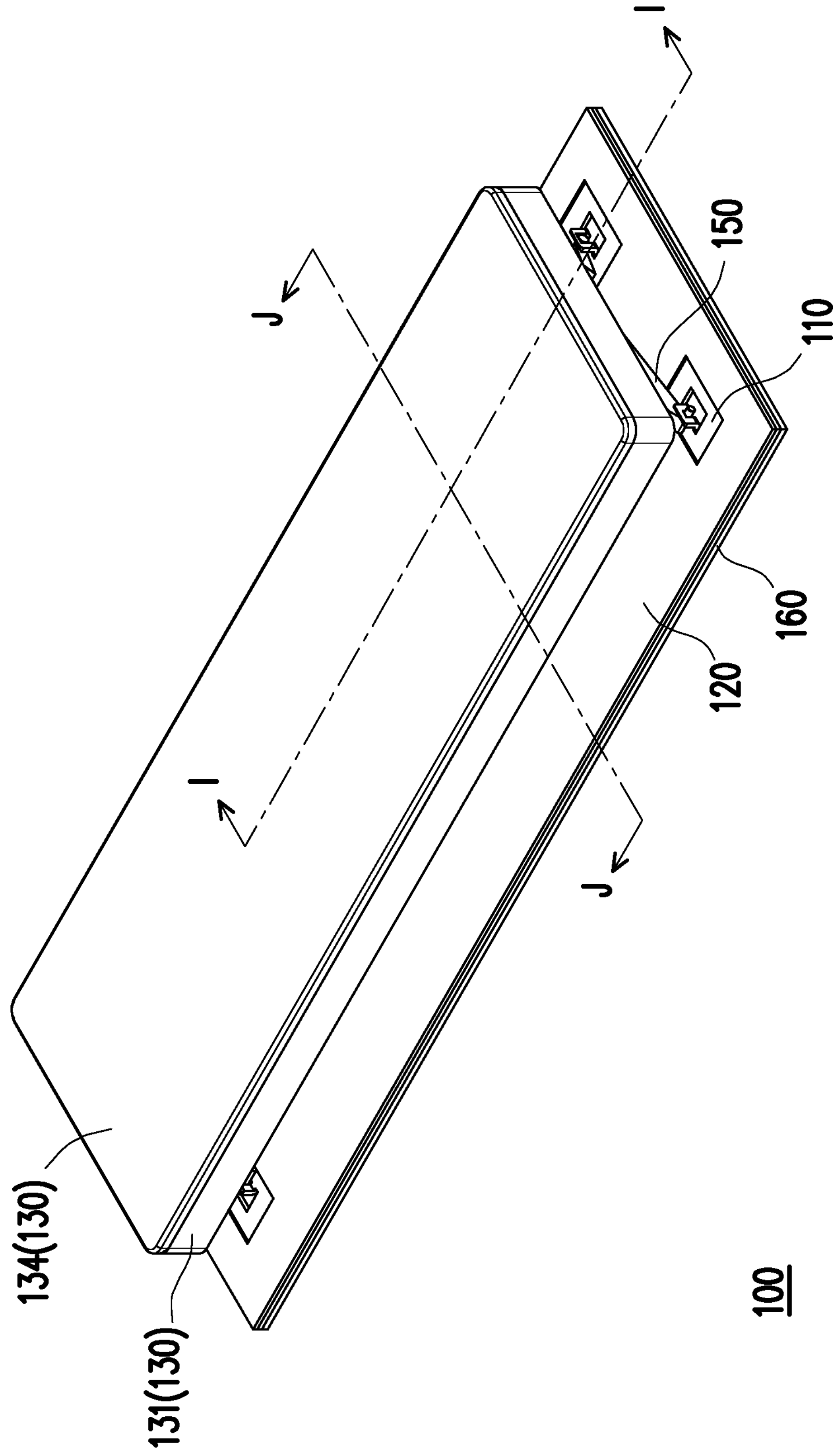
FIG. 1A is a schematic view of a key structure according to an embodiment of the disclosure.
Figure 1B:
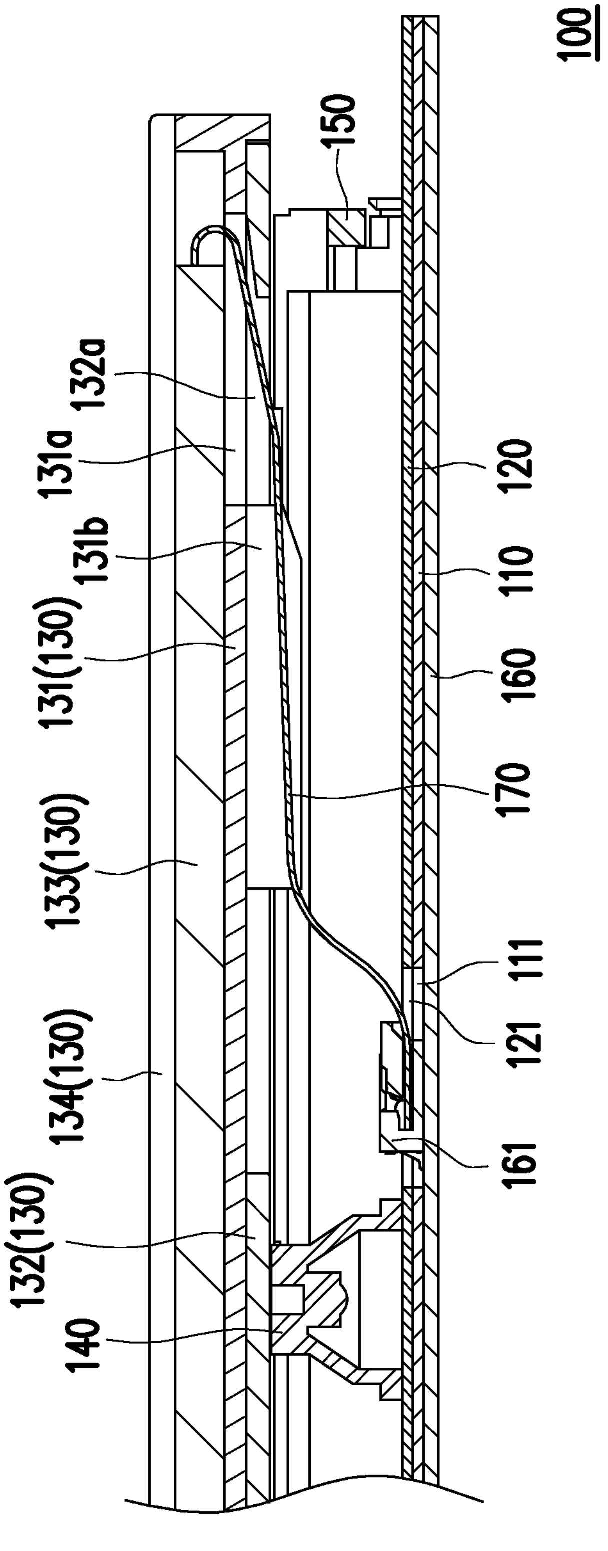
FIG. 1B is a partial cross-sectional view of FIG. 1A along a line I-I.
Figure 1C:
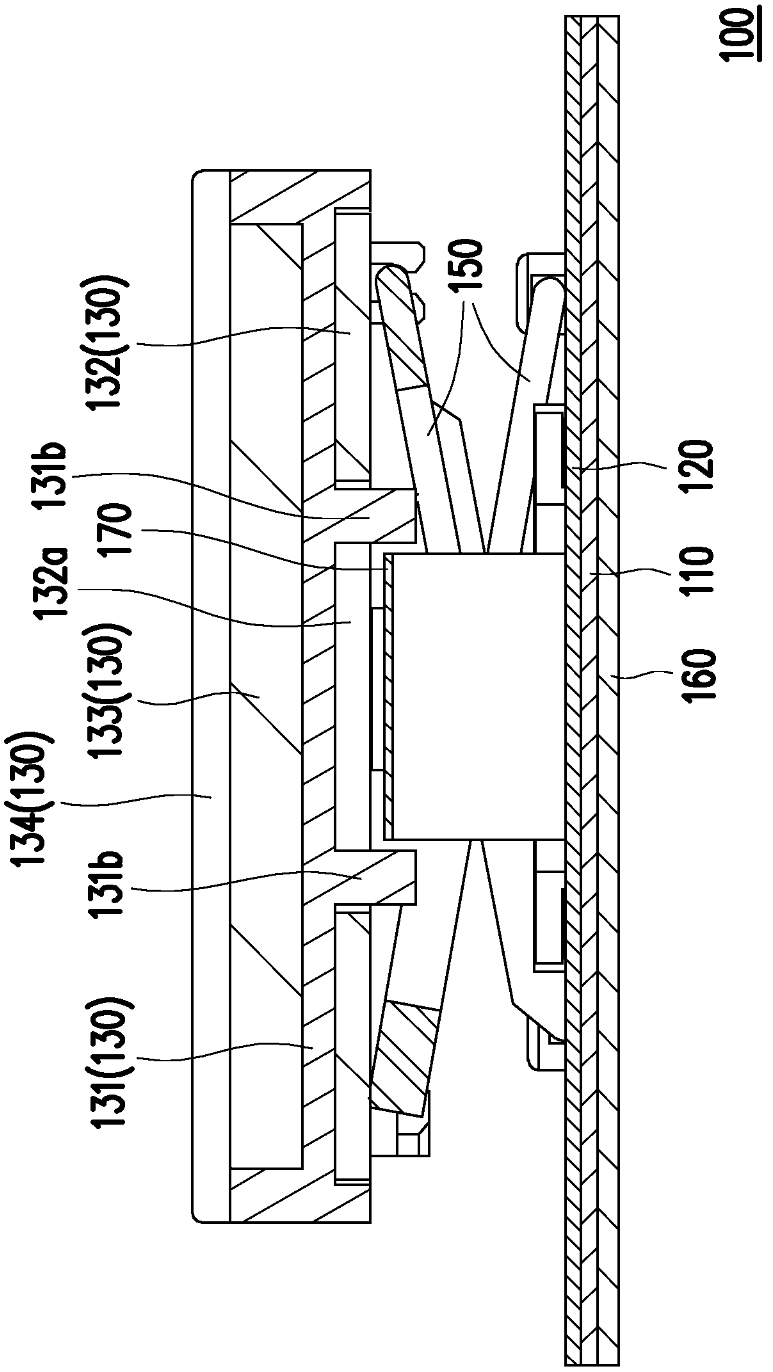
FIG. 1C is a cross-sectional view of FIG. 1A along a line J-J.

FIG. 1A is a schematic view of a key structure according to an embodiment of the disclosure. FIG. 1B is a partial cross-sectional view of FIG. 1A along a line I-I. FIG. 1C is a cross-sectional view of FIG. 1A along a line J-J. Referring to FIG. 1A and FIG. 1B, in this embodiment, a key structure 100 may be applied to a keyboard and has a display function. For example, the key structure 100 can display characters for a user to identify an input function, or the key structure 100 can display other information content (such as application programs or image information) besides characters to improve the convenience and flexibility of operation for the user and optimize the user experience.

In detail, the key structure 100 includes a base plate 110, a thin film circuit 120, a display key 130, an elastic supporting member 140, and a lifting mechanism 150, in which the thin film circuit 120 is disposed on the base plate 110, and the display key 130 having a display function is disposed above the thin film circuit 120. The elastic supporting member 140 may be a rubber dome or a metal dome, and is disposed between the display key 130 and the thin film circuit 120. The elastic supporting member 140 may be used to maintain the height of the display key 130 and provide a necessary elasticity for the display key 130 to restore position after being pressed. The lifting mechanism 150 may be a scissor-type or butterfly-type lifting mechanism, and is disposed between the display key 130 and the base plate 110 to guide the display key 130 to move toward the thin film circuit 120 or away from the thin film circuit 120 along a direction perpendicular to the base plate 110.

As shown in FIG. 1B, the display key 130 includes a first carrying member 131, a second carrying member 132, a display panel 133, and a light-transmitting keycap 134, in which the first carrying member 131 is disposed on the second carrying member 132, and the display panel 133 and the light-transmitting keycap 134 are disposed on the first carrying member 131. The light-transmitting keycap 134 covers the display panel 133, and the display panel 133 may be an organic light-emitting diode display panel, an electronic paper, or other types of display panels.

In an example, the user may define their own input function of the key structure 100 and display a corresponding character via the display panel 133. Therefore, the user may see the character on the display panel 133 via the light-transmitting keycap 134 and input functions by application programs. For users, the key structure 100 not only has excellent convenience and flexibility of operation, but also provides an excellent user experience.

In another example, the user may define their own input function of the key structure 100 and display the corresponding character via the display panel 133, at the same time, the display panel 133 can display application programs or image information other than the character. Therefore, the user may see the character and application programs or image information on the display panel 133 via the light-transmitting keycap 134 to identify the input function and obtain other information content besides the input function. For users, the key structure 100 not only has excellent convenience and flexibility of operation, but also provides an excellent user experience.

In another example, the character on the light-transmitting keycap 134 is already set when leaving the factory, but the display panel 133 can display application programs or image information. Therefore, the user can not only see the character on the light-transmitting keycap 134, but also see application programs or image information on the display panel 133 via the light-transmitting keycap 134. In other words, the user can obtain other information content besides the input function via the light-transmitting keycap 134. For users, the key structure 100 not only has excellent convenience of operation, but also provides an excellent user experience.

As shown in FIG. 1B, the elastic supporting member 140 is disposed between the second carrying member 132 and the thin film circuit 120, and the lifting mechanism 150 is disposed between the second carrying member 132 and the base plate 110. For example, the first carrying member 131 is magnetically positioned on the second carrying member 132 and may adopt a magnetic attraction mechanism with two magnets or a magnetic attraction mechanism with one magnet and one magnetic conductive member.

In this embodiment, the key structure 100 further includes a circuit board 160 and a flexible circuit board 170, in which the base plate 110 is disposed on the circuit board 160 and located between the circuit board 160 and the thin film circuit 120. In addition, the flexible circuit board 170 is connected between the display panel 133 and the circuit board 160, and the display panel 133 is electrically connected to the circuit board 160 through the flexible circuit board 170.

As shown in FIG. 1B, the first carrying member 131, the second carrying member 132, the thin film circuit 120, and the base plate 110 are located between the display panel 133 and the circuit board 160, and a wiring path of the flexible circuit board 170 is formed on the first carrying member 131, the second carrying member 132, the thin film circuit 120, and the base plate 110. Specifically, the first carrying member 131, the second carrying member 132, the thin film circuit 120, and the base plate 110 all have wiring grooves, and a wiring groove 131*a* of the first carrying member 131, a wiring groove 132*a* of the second carrying member 132, a wiring groove 121 of the thin film circuit 120, and a wiring groove 111 of the base plate 110 are connected with one another. In addition, a connector 161 of the circuit board 160 is located in the wiring groove 121 of the thin film circuit 120 and the wiring groove 111 of the base plate 110.

In this embodiment, the flexible circuit board 170 may pass through the wiring groove 131*a* of the first carrying member 131 and the wiring groove 132*a* of the second carrying member 132 from the display panel 133 and penetrate the wiring groove 121 of the thin film circuit 120 to be inserted into the connector 161. In detail, the wiring groove 132*a* of the second carrying member 132 extends from the wiring groove 131*a* of the first carrying member 131 to the wiring groove 121 of the thin film circuit 120, in which the wiring groove 131*a* of the first carrying member 131 is connected to a side of the wiring groove 132*a* of the second carrying member 132, and the wiring groove 121 of the thin film circuit 120 is connected to another side of the wiring groove 132*a* of the second carrying member 132. In other words, the flexible circuit board 170 passes through the wiring groove 132*a* of the second carrying member 132 and extends from the wiring groove 131*a* of the first carrying member 131 to the wiring groove 121 of the thin film circuit 120.

As shown in FIG. 1B and FIG. 1C, in this embodiment, the first carrying member 131 also has two protrusions 131*b* arranged in parallel and located in the wiring groove 132*a* of the second carrying member 132. In detail, the two protrusions 131*b* may be two positioning ribs and extend from the wiring groove 131*a* of the first carrying member 131 to the wiring groove 121 of the thin film circuit 120. After the flexible circuit board 170 penetrates the wiring groove 132*a* of the second carrying member 132, the flexible circuit board 170 may be positioned between the two protrusions 131*b* and extend toward the wiring groove 121 of the thin film circuit 120 to penetrate the wiring groove 121. In other words, the two protrusions 131*b* may define a positioning channel accommodating the flexible circuit board 170 and located between the wiring groove 131*a* of the first carrying member 131 and the wiring groove 121 of the thin film circuit 120.

The above example illustrates with two carrying members. In other examples, the number of carrying members may be one, and the disclosure does not limit the number of carrying members.

Figure 2:
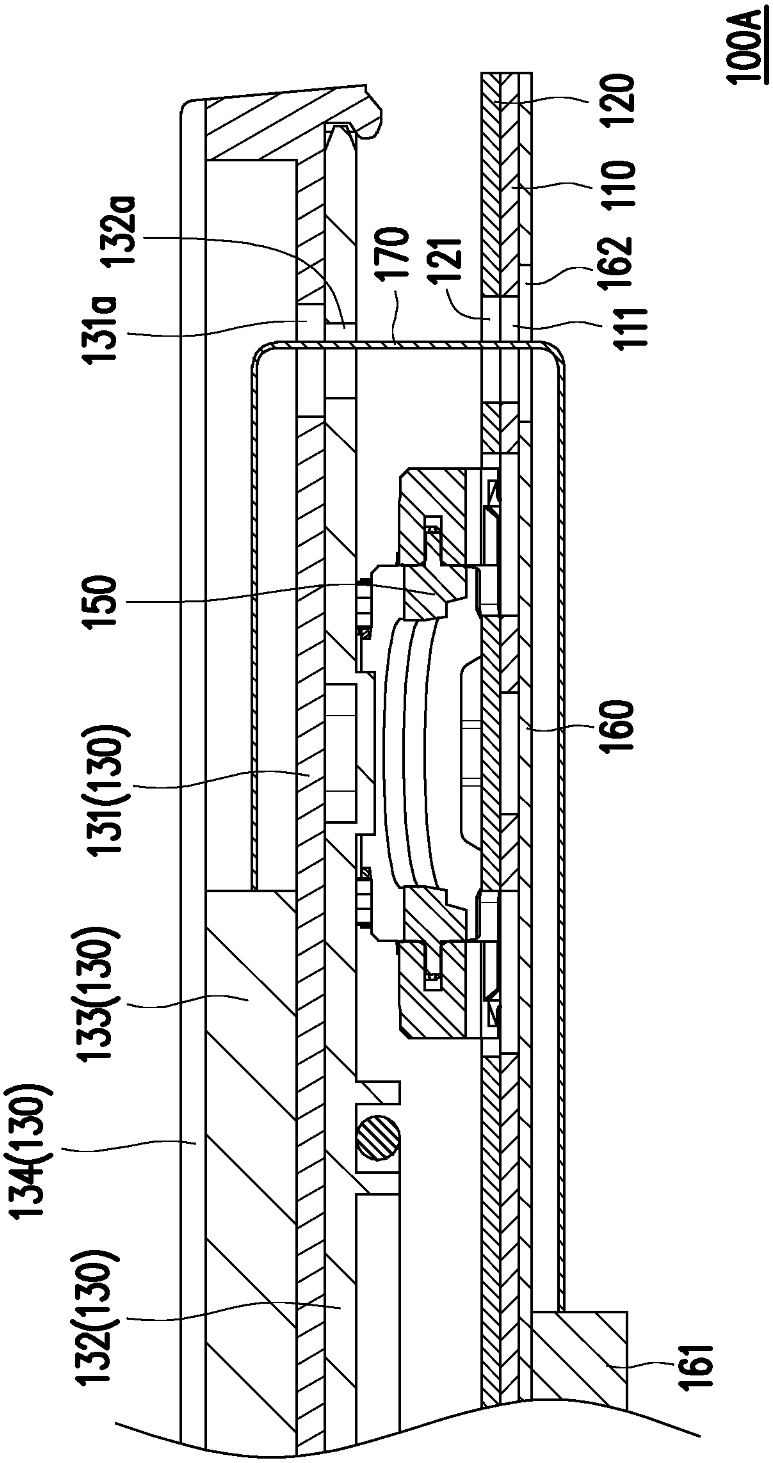
FIG. 2 is a partial cross-sectional view of the key structure according to another embodiment of the disclosure.

FIG. 2 is a partial cross-sectional view of the key structure of another embodiment of the disclosure. Please refer to FIG. 2. A key structure 100A of this embodiment is designed similar to the key structure 100 of the previous embodiment, and the main difference is the wiring path of the flexible circuit board 170.

In this embodiment, the circuit board 160 has a wiring groove 162 and is connected to the wiring groove 111 of the base plate 110. In addition, the connector 161 is located at a side of the circuit board 160 opposite to the base plate 110. The flexible circuit board 170 may pass through the wiring groove 131*a* of the first carrying member 131, the wiring groove 132*a* of the second carrying member 132, the wiring groove 121 of the thin film circuit 120, the wiring groove 111 of the base plate 110, and the wiring groove 162 of the circuit board 160 from the display panel 133 to be inserted into the connector 161. For example, the wiring groove 131*a* of the first carrying member 131, the wiring groove 132*a* of the second carrying member 132, the wiring groove 121 of the thin film circuit 120, the wiring groove 111 of the base plate 110, and the wiring groove 162 of the circuit board 160 are arranged in a straight line.

The above example illustrates with two carrying members. In other examples, the number of carrying members may be one, and the disclosure does not limit the number of carrying members.

In summary, the key structure of the disclosure has the display panel, and the display panel is covered by the light-transmitting keycap. Users can see the display screen on the display panel via the light-transmitting keycap to identify the input function or obtain other information content besides the input function, so an excellent user experience is provided.

Although the disclosure has been disclosed with the embodiments as above, the embodiments are not intended to limit the disclosure. Persons skilled in the art may make some modifications and changes without departing from the spirit and scope of the disclosure. Therefore, the scope of protection of the disclosure shall be determined by the appended claims.

What is claimed is:

1. A key structure, comprising:
- a base plate;
- a thin film circuit disposed on the base plate;
- a display key disposed above the thin film circuit;
- an elastic supporting member disposed between the display key and the thin film circuit;
- a lifting mechanism disposed between the display key and the base plate, wherein the display key comprises:
  - at least one carrying member, wherein the elastic supporting member is disposed between the at least one carrying member and the thin film circuit, and the lifting mechanism is disposed between the at least one carrying member and the base plate;
  - a display panel disposed on the at least one carrying member; and a light-transmitting keycap disposed on the at least one carrying member and covering the display panel; and a circuit board, wherein the base plate is disposed between the circuit board and the thin film circuit, and the display panel is electrically connected to the circuit board.

2. The key structure according to claim 1, further comprising:

a flexible circuit board connected between the display panel and the circuit board.

3. The key structure according to claim 2, wherein each of the at least one carrying member, the thin film circuit, the base plate, and the circuit board is provided with a wiring groove, and the flexible circuit board passes through the wiring groove of the at least one carrying member, the wiring groove of the thin film circuit, the wiring groove of the base plate, and the wiring groove of the circuit board from the display panel to be inserted into a connector of the circuit board.

4. The key structure according to claim 2, wherein each of the at least one carrying member, the thin film circuit, and the base plate is provided with a wiring groove, a connector of the circuit board is located in the wiring groove of the thin film circuit and the wiring groove of the base plate, and the flexible circuit board passes through the wiring groove of the at least one carrying member from the display panel and penetrates the wiring groove of the thin film circuit to be inserted into the connector.

5. The key structure according to claim 4, wherein the wiring groove of the at least one carrying member, the wiring groove of the thin film circuit, and the wiring groove of the base plate are connected with one another.

6. The key structure according to claim 1, wherein a number of the at least one carrying member is two, including a first carrying member and a second carrying member, the light-transmitting keycap and the display panel are disposed on the first carrying member, the first carrying member is disposed on the second carrying member, the elastic supporting member is disposed between the second carrying member and the thin film circuit, and the lifting mechanism is disposed between the second carrying member and the base plate.

7. The key structure according to claim 6, further comprising:

a circuit board, wherein the base plate is disposed between the circuit board and the thin film circuit; and a flexible circuit board, wherein the display panel is electrically connected to the circuit board through the flexible circuit board, each of the first carrying member, the second carrying member, the thin film circuit, and the base plate is provided with a wiring groove, a connector on the circuit board is located in the wiring groove of the thin film circuit and the wiring groove of the base plate, and the flexible circuit board passes through the wiring groove of the first carrying member and the wiring groove of the second carrying member from the display panel and penetrates the wiring groove of the thin film circuit to be inserted into the connector.

8. The key structure according to claim 7, wherein the first carrying member also has two protrusions arranged in parallel and located in the wiring groove of the second carrying member, and the flexible circuit board penetrates the wiring groove of the second carrying member from the wiring groove of the first carrying member and extends toward the wiring groove of the thin film circuit between the two protrusions to penetrate the wiring groove of the thin film circuit.

* * * * *